(12) United States Patent
Tanaka

(10) Patent No.: US 11,428,147 B2
(45) Date of Patent: Aug. 30, 2022

(54) AIR PURIFICATION DEVICE FOR A VEHICLE

(71) Applicant: TOYOTA JIDOSHA KABUSHIKI KAISHA, Aichi-ken (JP)

(72) Inventor: Toru Tanaka, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/133,638

(22) Filed: Dec. 24, 2020

(65) Prior Publication Data

US 2021/0215088 A1 Jul. 15, 2021

(30) Foreign Application Priority Data

Jan. 14, 2020 (JP) .............................. JP2020-003993

(51) Int. Cl.
| | | |
|---|---|---|
| *B60R 21/30* | (2006.01) | |
| *B01D 53/04* | (2006.01) | |
| *F01P 5/06* | (2006.01) | |
| *F01P 3/18* | (2006.01) | |
| *F01P 5/04* | (2006.01) | |
| *B60K 11/02* | (2006.01) | |
| *B60H 1/00* | (2006.01) | |

(52) U.S. Cl.
CPC ............ *F01P 5/04* (2013.01); *B60H 1/00328* (2013.01); *B60K 11/02* (2013.01); *F01P 5/06* (2013.01); *F01P 2005/046* (2013.01)

(58) Field of Classification Search
CPC ................ B60R 21/30; B01D 53/8675; B01D 2257/106; B01D 2257/708; B01D 53/0438; F01P 3/18; F01P 5/06
See application file for complete search history.

(56) References Cited

U.S. PATENT DOCUMENTS

| | | | | |
|---|---|---|---|---|
| 6,190,627 B1* | 2/2001 | Hoke | .................. | B01D 53/864 |
| | | | | 423/247 |
| 6,200,542 B1* | 3/2001 | Poles | ................. | B01D 53/0407 |
| | | | | 423/247 |
| 6,517,899 B1* | 2/2003 | Hoke | .................. | B01D 53/885 |
| | | | | 502/514 |
| 6,818,254 B1* | 11/2004 | Hoke | .................... | B01D 53/02 |
| | | | | 502/506 |
| 8,999,255 B2* | 4/2015 | Shinoda | ................. | B01D 53/46 |
| | | | | 422/186.3 |

(Continued)

FOREIGN PATENT DOCUMENTS

JP 5672373 B2 2/2015

*Primary Examiner* — Long T Tran
(74) *Attorney, Agent, or Firm* — Hauptman Ham, LLP

(57) ABSTRACT

There is provided an air purification device for a vehicle having a radiator core that is provided in an interior portion of an engine bay in a front portion of a vehicle, and through which air that has been introduced from a vehicle front side passes into the interior portion of the engine bay in the direction of the vehicle rear side, and a radiator fan that is disposed on the vehicle rear side of the radiator core, and has plate-shaped fan portions that are rotated by rotation drive force supplied from a motor assembly so as to introduce air from outside the engine bay into the interior portion of the engine bay, and that also has an ozone decomposition catalyst coated onto the fan portions.

9 Claims, 9 Drawing Sheets

(56) References Cited

U.S. PATENT DOCUMENTS

| | | | |
|---|---|---|---|
| 2002/0015640 A1* | 2/2002 | Nishiyama | F01P 11/12 |
| | | | 415/119 |
| 2003/0059356 A1* | 3/2003 | Hoke | B01D 53/864 |
| | | | 423/210 |
| 2004/0146400 A1* | 7/2004 | Robb | F01P 5/06 |
| | | | 415/211.2 |
| 2011/0067845 A1* | 3/2011 | Bishop | F04D 29/646 |
| | | | 415/182.1 |
| 2014/0013953 A1 | 1/2014 | Sugimoto et al. | |
| 2015/0007731 A1* | 1/2015 | Shinoda | B01D 53/0462 |
| | | | 96/111 |
| 2015/0119234 A1* | 4/2015 | Buelow | B01J 31/28 |
| | | | 502/325 |

* cited by examiner

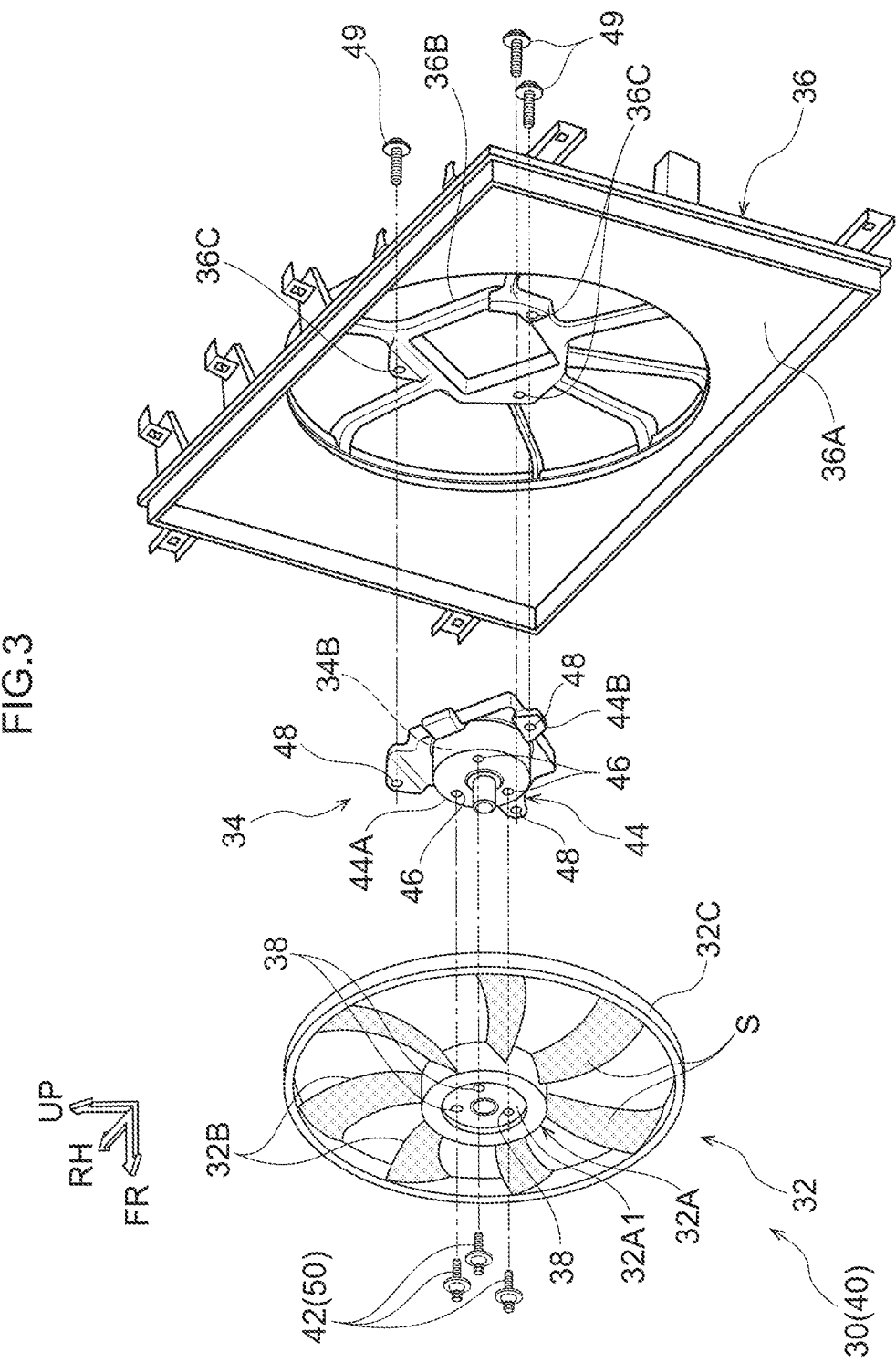

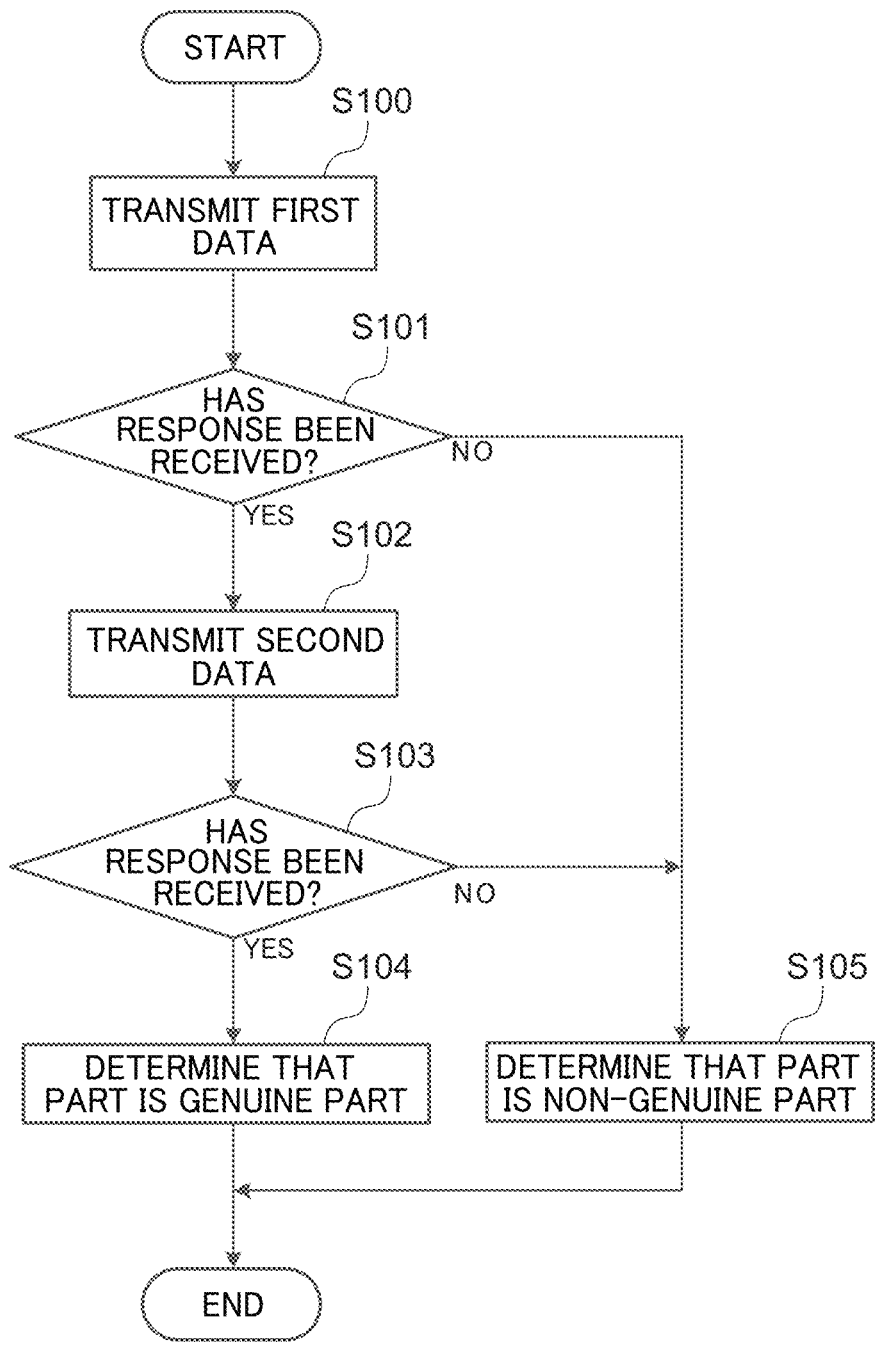

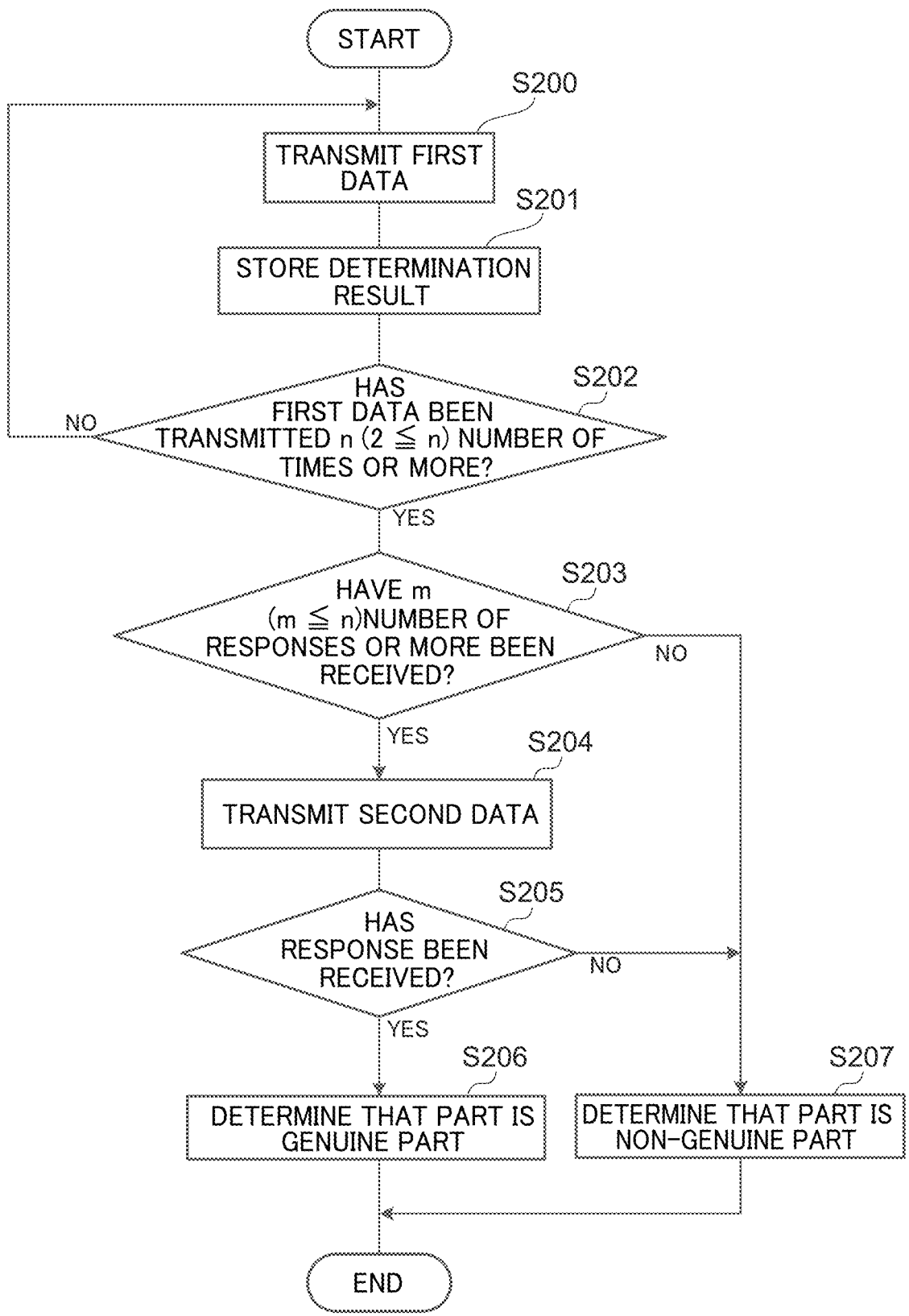

AIR PURIFICATION DEVICE FOR A VEHICLE

CROSS-REFERENCE TO RELATED APPLICATION

This application is based on and claims priority under 35 USC 119 from Japanese Patent Application No. 2020-003993 filed on Jan. 14, 2020, the disclosure of which is incorporated by reference herein.

BACKGROUND

Technical Field

The present disclosure relates to an air purification device for a vehicle.

Related Art

Ozone (O3), which one cause of the generation of photochemical smog, is generated as a result of nitrogen oxide (NOx), which is contained in exhaust gas from a vehicle, and non-methane organic gases (NMOG) initiating a photochemical reaction together with volatile organic compounds (VOG). For this reason, suppressing the quantities of NOx and NMOG that are discharged from a vehicle is an effective means of suppressing the generation of ozone and of thereby preventing the generation of photochemical smog. Another method that might be considered for preventing the generation of photochemical smog is the direct purification of ozone in the air. By not aiming solely at reducing the quantities of NOx and NMOG, which are reactants, that are discharged, but by also achieving a purification of the ozone, which is a product, it is possible to even more effectively prevent photochemical smog from being generated. From this standpoint, in several regions beginning with the State of California in the United States, vehicles that are equipped with an air purification device for a vehicle that enables ozone in the air to be directly purified are in actual use. These air purification devices for a vehicle are commonly known as Direct Ozone Reduction (DOR) systems.

An example of this type of DOR system is an air purification device for a vehicle disclosed in Japanese Patent No. 5672373. In this air purification device for a vehicle, fins of a radiator core are coated with an ozone decomposition catalyst (i.e., an ozone purifier). In this DOR system, when air that has been introduced into the engine bay while the vehicle is traveling passes through the radiator core, ozone in this air reacts with the ozone decomposition catalyst and is converted into other substances such as oxygen. As a result, ozone in this air is purified.

When the ozone decomposition catalyst is being coated onto the radiator core, from the standpoint of production costs and the like, generally, it is desirable that a method that employs low-cost spray coating or the like be used.

However, as in the technology described in the aforementioned Japanese Patent No. 5672373, when the fins are coated with an ozone decomposition catalyst, even if the catalyst is sprayed onto the surface of the radiator core, it is still difficult to ensure that the catalyst has been properly coated onto the surface of the fins. The reason for this is that the surface of the radiator core is formed in a fine lattice configuration by joining together a refrigerant tube and a plurality of fins. Because of this, the sprayed catalyst forms a film on the surface of the radiator core, and it becomes difficult for the sprayed catalyst to reach the surface of each of the fins. Because of circumstances such as these, when the fins are being coated with the ozone decomposition catalyst, special coating technology is required, and this leads to an increase in production costs. Accordingly, from this standpoint the above-described technology has room for improvement.

SUMMARY

In view of the above-described circumstances, it is the present disclosure to provide an air purification device for a vehicle that purifies ozone contained in air, and can also be provided at a low cost.

An air purification device for a vehicle according to a first aspect of the present disclosure includes a radiator core that is provided in an interior portion of an engine bay in a front portion of a vehicle, and through which air that has been introduced from a vehicle front side passes into the interior portion of the engine bay toward a vehicle rear side, and a radiator fan that is disposed at the vehicle rear side of the radiator core, and that has plate-shaped fan portions that are rotated by rotation drive force supplied from a motor assembly so as to introduce air from outside of the engine bay into the interior portion of the engine bay, the fan portions being coated with an ozone decomposition catalyst.

In the air purification device for a vehicle according to the first aspect, when air is introduced into the engine bay interior while the vehicle is traveling or while the radiator fan is rotating, the air that passes through the radiator core comes into contact with the fan portions of the radiator fan. As a result, ozone in this air reacts with the ozone decomposition catalyst coated onto the surface of the fan portion and is decomposed into another substance, so that the air can be purified.

Here, the ozone decomposition catalyst is coated onto the fan portions forming part of the radiator fan. In addition, the fan portions are formed in a planar shape. Because of this, the ozone decomposition catalyst can be easily coated onto the fan portions using a general spray coating method, and can therefore be supplied at low cost.

An air purification device for a vehicle according to a second aspect of the present disclosure is characterized in that, in the structure according to the first aspect, the radiator fan is joined via the motor assembly to a shroud that is fixed to a vehicle body, and a separation prevention device that prevents the radiator fan from being separated from the motor assembly is provided in a join portion between the radiator fan and the motor assembly.

The following should be noted in relation to NMOG in the exhaust gas regulations of the State of California. Namely, predetermined benefits (NMOG credits) that are regarded as contributing to a reduction in the quantity of NMOG that is discharged are granted to vehicles, and to the makers selling such vehicles, in which an air purification device (i.e., a DOR system) is installed, and that travel while decomposing (i.e., purifying) ozone using an ozone decomposition catalyst. However, the ozone purification performance of such air purification devices is inconsistent, and is reduced by deterioration of the catalyst and by peeling away of the catalyst layer and the like. For this reason, NMOG credits are granted in accordance with the ozone purification performance after 150,000 miles (approximately 240,000 km) of travel. Accordingly, each maker determines a value of the ozone purification performance after 150,000 miles of travel for each style of vehicle and each model of vehicle via a variety of tests, and makes the appropriate claim to the relevant authorities for NMOG credits using this value or using a claim value that is lower than this value.

In contrast, once a vehicle has been sold to a user, maintenance and the like are conducted as this vehicle is moved from place to place, and there is a possibility that the air purification device will be replaced by one that is low in cost and is not a genuine part. In such cases, it may not be possible to obtain an effective claim value. In particular, parts that have been coated with an ozone decomposition catalyst are considerably more expensive compared to normal parts that have not been coated with an ozone decomposition catalyst. For this reason, genuine parts that are coated with an ozone decomposition catalyst are often replaced with non-genuine parts. If this is considered in relation to the air purification device according to the present disclosure, then it is clearly desirable for there to be provided an effective device for preventing a radiator fan coated with an ozone decomposition catalyst from being replaced by a non-genuine part.

Here, in the air purification device for a vehicle according to the second aspect, the radiator fan is joined via the motor assembly to a shroud that is fixed to a vehicle body. In addition, a separation prevention device that prevents the radiator fan from being separated from the motor assembly is provided at a join portion between the radiator fan and the motor assembly. Because of this, it is possible to prevent a situation such as the radiator fan of an air purification device for a vehicle being replaced by a non-genuine radiator fan when maintenance or the like is performed during the period of use of the vehicle. As a consequence, it is possible to guarantee that a genuine part is installed.

An air purification device for a vehicle according to a third aspect of the present disclosure is characterized in that, in the structure according to the second aspect, the join portion between the radiator fan and the motor assembly is bolt-fastened by fan bolts, and in the separation prevention device the fan bolts comprise break head bolts, such that after the fan bolts have been fastened, the radiator fan is prevented from being separated from the motor assembly.

In the air purification device for a vehicle according to the third aspect, a structure is employed in which the join portion between the radiator fan and the motor assembly is bolt-fastened by the vehicle's fan bolts which are formed by break head bolts. Because of this, once the fan bolts have been fastened, it is not possible to subsequently undo the fastening provided by the fan bolts so that, consequently, the radiator fan cannot be removed. As a result, it is possible to prevent the radiator fan from being separated from the motor assembly. Moreover, according to the separation prevention device having the above-described structure, this separation prevention device can be installed at the same time as the radiator fan is assembled, and can therefore be provided without the manufacturing process having to be altered. Additionally, there is no need to increase the number of components used for the radiator fan join portion. As a result, it is possible to prevent a situation in which the radiator fan is replaced by a non-genuine radiator fan, and the air purification device can be provided at a low cost.

An air purification device for a vehicle according to a fourth aspect of the present disclosure is characterized in that, in the structure according to the second aspect, the join portion between the radiator fan and the motor assembly is bolt-fastened by fan bolts, and the separation prevention device is configured such that, after being fastened, the fan bolts can be adhered by means of an adhesive agent that is coated on a shaft portion thereof to at least one of the radiator fan or the motor assembly, such that the radiator fan is prevented from being separated from the motor assembly.

In the air purification device for a vehicle according to the fourth aspect, a structure is employed in which the join portion between the radiator fan and the motor assembly is bolt-fastened by fan bolts which have an adhesive agent coated on a shaft portion thereof. Because of this, when the fan bolts are fastened, the shaft portion of the fan bolts and at least one of the radiator fan and the motor assembly are adhered together so that the fan bolts are unable to be removed. As a consequence, it is possible to prevent the radiator fan from being separated from the motor assembly. Moreover, according to the separation prevention device having the above-described structure, this separation prevention device can be installed at the same time as the radiator fan is assembled, and can therefore be provided without the manufacturing process having to be altered. Additionally, there is no need to increase the number of components used for the radiator fan join portion. As a result, it is possible to prevent a situation in which the radiator fan is replaced by a non-genuine radiator fan, and the air purification device can be provided at a low cost.

An air purification device for a vehicle according to a fifth aspect of the present disclosure is characterized in that, in the structure according to any one of the second through fourth aspects, a join portion between the motor assembly and the shroud is bolt-fastened by shroud bolts, and the shroud bolts are fastened from the vehicle rear side of the shroud so as to join the shroud and the motor assembly together.

In the air purification device for a vehicle according to the fifth aspect, the join portion between the motor assembly and the shroud is bolt-fastened by shroud bolts. In addition, the shroud bolts are fastened from the vehicle rear side of the shroud so as to join the shroud and the motor assembly together. Because of this, in order to be able to remove the shroud bolts, it is necessary to first perform the task of removing the shroud from the vehicle body. For this reason, the task of removing the motor assembly from the vehicle body is a large-scale operation requiring considerable time and labor. As a consequence, it is possible to inhibit a genuine radiator fan being replaced by a non-genuine radiator fan that is formed integrally with the motor assembly.

An air purification device for a vehicle according to a sixth aspect of the present disclosure is characterized in that, in the structure according to any one of the first through fifth aspects, the motor assembly has a fan controller that controls a rotation speed of the radiator fan based on a control signal from a predetermined ECU, and the air purification device for a vehicle is provided with the predetermined ECU that includes a rotation speed determination unit that determines a rotation speed of the radiator fan, and a genuine part determination unit that transmits a collation signal to the fan controller, and then determines whether or not the radiator fan is a genuine part based on a response from the fan controller to the transmitted collation signal.

Generally, it is common for the rotation speed of the radiator fan to be controlled by a fan controller based on a control signal from a predetermined ECU such as an engine ECU. Here, in the present disclosure according to the sixth aspect, using an already established communication environment between a predetermined ECU and the fan controller, it is possible to transmit a predetermined collation signal from the ECU to the fan controller, and then determine whether or not the radiator fan is a genuine part based on the response from the fan controller. Because it is possible, in this way, to determine whether a part is a genuine part simply by adding the predetermined collation signal via software instead of by adding a new hardware structure to the vehicle, the present disclosure can be provided at a low cost.

An air purification device for a vehicle according to a seventh aspect of the present disclosure is characterized in that, in the structure according to the sixth aspect, the genuine part determination unit sequentially transmits a plurality of types of collation signals to the fan controller, and determines whether or not the radiator fan is a genuine part based on responses from the fan controller to each of the collation signals, and determines that the radiator fan is a genuine part when determination results for each of the collation signals all determine that the radiator fan is a genuine part.

In the air purification device for a vehicle according to the seventh aspect, by determining whether or not the radiator fan is a genuine part using a plurality of types of collation signals, it is possible to prevent an unscrupulous operator from evading a determination result. As a result, it is possible to improve the accuracy when determining whether or not a radiator fan is a genuine part.

An air purification device for a vehicle according to an eighth aspect of the present disclosure is characterized in that, in the structure according to the sixth aspect, the genuine part determination unit transmits the collation signals n times to the fan controller, and determines, n times, whether or not the radiator fan is a genuine part based on the responses from the fan controller, wherein n≥2, and determines that the radiator fan is a genuine part at least when the radiator fan is determined to be a genuine part m times, wherein m≤n.

Note that in a determination made using collation signals, there is a possibility that an incorrect determination will be made because of electromagnetic noise coming from other electronic instruments mounted in the vehicle.

Here, in the air purification device for a vehicle according to the eighth aspect, determinations based on collation signals are made a plurality of times (n number of times), and when it is determined a predetermined threshold value number of times (m number of times) or more that the radiator fan is a genuine part, then the radiator fan is determined to be a genuine part. As a result, it is possible to reduce the effects of incorrect determinations that are due to electromagnetic noise, and it is thereby possible to improve the accuracy when determining whether or not a radiator fan is a genuine part.

The air purification device of the first aspect of the present disclosure has the excellent effect that ozone in the air can be purified, and the air purification device can also be provided at a lower cost.

The air purification device of the second aspect has the excellent effect that it is possible to prevent a situation such as the radiator fan of an air purification device for a vehicle being replaced by a non-genuine radiator fan, so that it becomes possible to guarantee that a genuine part is installed.

The air purification device of the third and fourth aspects has the excellent effect that, in addition to it being possible to prevent a situation such as the radiator fan being replaced by a non-genuine radiator fan, this air purification device can be provided at a low cost.

The air purification device of the fifth aspect has the excellent effect that it is possible to inhibit a genuine radiator fan being replaced by a non-genuine radiator fan that is formed integrally with the motor assembly.

The air purification device of the sixth aspect has the excellent effect that it is possible to determine even more cheaply whether or not a radiator fan is a genuine part.

The air purification device of the seventh and eighth aspects has the excellent effect that it is possible to improve the accuracy when determining whether or not a radiator fan is a genuine part.

BRIEF DESCRIPTION OF THE DRAWINGS

Exemplary embodiments of the present disclosure will be described in detail based on the following figures, wherein:

FIG. 3 is an exploded perspective view showing this same electromotive fan assembly;

FIG. 8 is a flowchart showing a flow of determination processing performed by this same engine ECU; and FIG. 9 is a flowchart showing a flow of a variant example of determination processing performed by this same engine ECU.

DETAILED DESCRIPTION

Hereinafter, a vehicle 10 in which an air purifier device for a vehicle 40 according to the present exemplary embodiment has been installed will be described based on FIG. 1 through FIG. 9. Note that an arrow UP, an arrow FR, and an arrow RH that are shown in the appropriate drawings respectively indicate a vehicle upward direction, a vehicle forward direction, and a vehicle right-side direction. Moreover, if front-rear, left-right, or up-down directions are used in the following description, then, unless specifically stated otherwise, these refer respectively to the front-rear directions of the vehicle, the left-right directions of the vehicle (i.e., the vehicle width direction) when the vehicle is facing in a direction of travel, and the up-down directions of the vehicle.

(Overall Structure)

Figure 1:
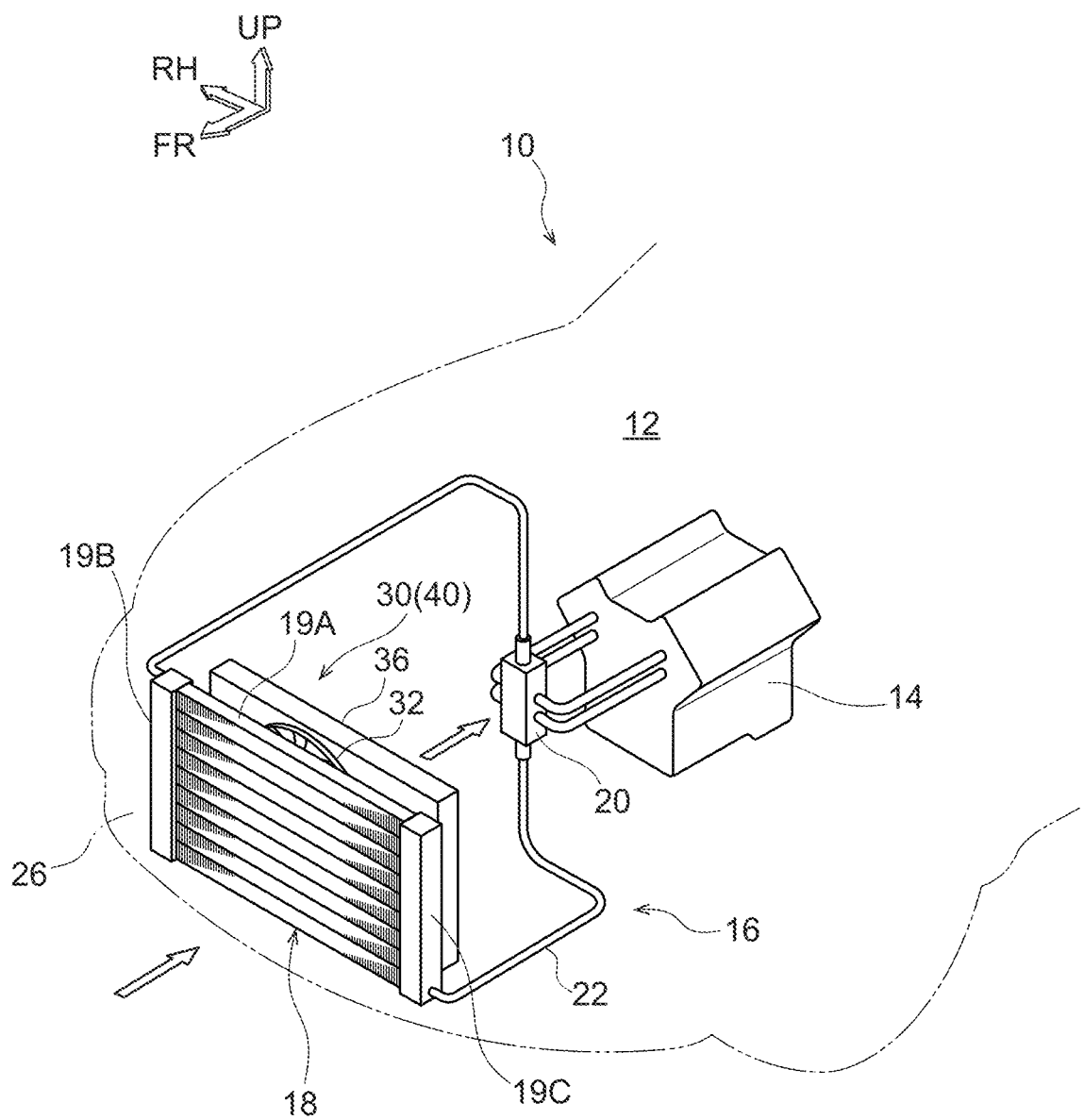
FIG. 1 is a perspective view schematically showing from a diagonally forward direction a vehicle in which an air purification device for a vehicle according to the present exemplary embodiment has been installed.

As is shown in FIG. 1, an engine bay 12 in which an engine 14 is mounted is provided in a front portion of the vehicle 10. A radiator 16 which is used to cool the engine is disposed on the vehicle front side of the engine 14. This radiator 16 is provided with a radiator core 18, a pump 20, a coolant pipe 22 through which a coolant is circulated, and an electromotive fan assembly 30.

The radiator core 18 is formed by a core body 19A and side tanks 19B and 19C.

The core body 19A is formed substantially in a rectangular frame shape when looked at in a vehicle front-rear direction, and is a frame body that supports the coolant pipe 22 which is laid so as to turn back on itself a plurality of times in the vehicle width direction. Multiple fins (no symbol is given for these in the drawings) are attached to the coolant pipe 22. Air that passes through a grill 26 while the vehicle 10 is traveling and is subsequently introduced into the interior of the engine bay 12 passes between these fins thereby cooling the coolant inside the coolant pipe 22. The coolant pipe 22 is connected to a flow path (i.e., a water jacket) inside the engine 14, so that coolant that is fed under pressure by the pump 20 circulates through interior of the engine 14 via the coolant pipe 22, and performs a heat exchange. As a result, the engine 14 can be cooled.

The side tanks 19B and 19C are formed in an elongated shaped extending in the vehicle up-down direction. These tanks 19B and 19C are mounted on both sides in the vehicle width direction of the core body 19A, and protect the turn-back portions of the coolant pipe 22 while internally storing a coolant. Moreover, an upper end portion and a lower end portion of each of these side tanks 19A and 19B are fixed to a radiator support frame (not shown in the drawings) that extends in the vehicle width direction. Additionally, this radiator support frame is supported at both end portions thereof in the vehicle width direction on a structural frame of the vehicle body (not shown in the drawings). As a result, the radiator core 18 is also fixed to the vehicle body.

Figure 2:
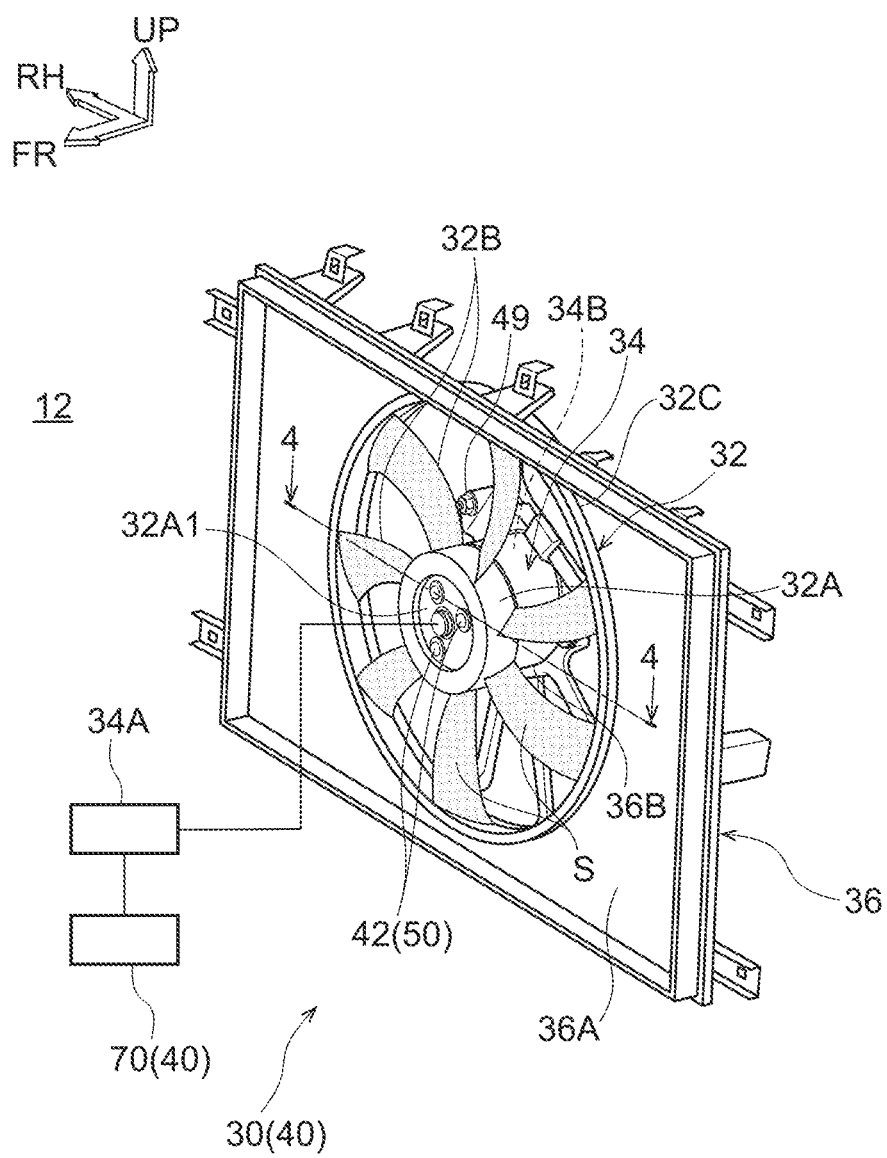
FIG. 2 is a perspective view showing an electromotive fan assembly shown in FIG. 1.

As is shown in FIG. 1 and FIG. 2, the electromotive fan assembly 30 includes a radiator fan 32, a motor assembly 34, and a shroud 36. The radiator fan 32 is formed such that when the radiator fan 32 is rotated, external air from outside the engine bay 12 is introduced into the interior of the engine bay 12. More specifically, a flow path for air flowing from the vehicle front side towards the vehicle rear side is formed inside the engine bay 12 as a result of the radiator fan 32 being rotated. As a result, even when the vehicle is stopped, external air from outside the engine bay 12 can be made to pass through the radiator core 18 and introduced into the interior of the engine bay 12.

The motor assembly 34 includes a fan controller 34A and a motor 34B, and supports the radiator fan 32 such that this is able to rotate. The fan controller 34A is a control device that controls the rotation speed of the motor 34B. This fan controller 34A is electrically connected to an engine ECU 70 (described below) and to the motor 34B and, based on signals from the engine ECU 70, performs control so that the motor 34B is made to rotate at a predetermined rotation speed. The motor 34B is formed so as to be able to rotate upon being supplied with power from a battery (not shown in the drawings), and imparts rotation drive force to the radiator fan 32. The shroud 36 is formed in a substantially rectangular shape when looked at in the vehicle front-rear direction, and is formed in a flat box shape that opens towards the vehicle front side. This shroud 36 supports the motor assembly 34 via a central portion of a bottom wall portion 36A thereof, and is formed so as to cover the periphery of the radiator fan. Additionally, the shroud 36 is fixed to the radiator core 18, which is disposed on the vehicle front side, via a mounting portion (no symbol for this is shown in the drawings) that is provided around a peripheral edge of the bottom wall portion 36A.

Here, ozone decomposition areas S on whose surfaces is coated an ozone decomposition catalyst are provided on the above-described radiator fan 32. When air comes into contact with these surfaces in the ozone decomposition areas S, ozone in this air reacts with the ozone decomposition catalyst and is converted into another substance such as oxygen. As a result, the ozone in this air is purified. In this way, the electromotive fan assembly 30 that is provided with the radiator fan 32 forms part of the radiator 16, and also forms part of the air purification device for a vehicle 40 which decomposes ozone contained in air.

(Air Purification Device)

Hereinafter, the structure of the air purification device for a vehicle 40 will be described in detail.

As is shown in FIG. 2, the air purification device for a vehicle 40 is formed so as to include the above-described electromotive fan assembly 30 and the engine ECU 70. In addition, the ozone decomposition areas S are provided in the radiator fan 32 that forms part of the electromotive fan assembly 30. Hereinafter, a join structure between the radiator fan 32 and the motor assembly 34, as well as the engine ECU 70 will be described.

As is shown in FIG. 3, the radiator fan 32 includes a fan join portion 32A that is joined to the motor assembly 34, a plurality of fan portions 32B that extend out from the fan join portion 32A, and an outer frame portion 32C that forms part of an outer edge portion of the radiator fan 32. The fan join portion 32A is provided in a center portion when looked at in the vehicle front-rear direction, and is formed substantially in a circular cylinder shape whose axial direction extends in the vehicle front-rear direction. Moreover, a bottom surface portion 32A1 whose plate thickness direction extends in the vehicle front-rear direction is formed in an end portion on the vehicle front side of the fan join portion 32A, and this bottom surface portion 32A1 forms part of a join surface with the motor assembly 34. A plurality of through holes 38 into which are inserted fan bolts 42 (described below) are provided so as to penetrate the bottom surface portion 32A1 in the plate thickness direction thereof.

The fan portions 32B are formed as planar blades, and a plurality of the fan portions 32B are provided on a side surface of the fan join portion 32A. The plurality of fan portions 32B are oriented so that a plate thickness direction thereof extends substantially in the vehicle front-rear direction, and each fan portion 32B extends from the side surface portion of the fan join portion 32A towards an outer side in a substantially radial direction. In addition, the outer frame portion 32C is formed as an annular frame body when looked at in the vehicle front-rear direction, and distal end portions of the plurality of fan portions 32B are joined to a surface on an inner side in the radial direction thereof.

The ozone decomposition areas S on whose surfaces is coated an ozone decomposition catalyst are provided on the fan portions 32B. The ozone decomposition catalyst may be a compound whose principal constituent is, as an example, a metal oxide such as manganese dioxide or the like, and may also contain activated carbon. However, the present disclosure is not limited to this, and together with activated carbon there may also be provided as a principal constituent a simple metal such as manganese, iron, cobalt, nickel, copper, ruthenium, rhodium, palladium, silver, platinum, or gold, or a metal complex or organometallic complex whose central metal is formed by these simple metals, or zeolite. In addition, two or more of these simple metals, metal complexes, organometallic complexes, and zeolite may be used simultaneously.

In the present exemplary embodiment, the ozone decomposition areas S are formed by the portions of the plate-shaped fan portions 32B that face towards the vehicle front side (i.e., by the front surfaces thereof). The ozone decomposition areas S are formed by coating a liquid paint material containing an ozone decomposition catalyst onto the portions of the fan portions 32B that face towards the vehicle front side using a spray coating method.

There are three principal reasons why the ozone decomposition areas S are formed on the surfaces on the side of the fan portions 32B that faces towards the vehicle front side. The first reason is that there is increased efficiency of the ozone decomposition performance on this side. The surfaces on the side of the fan portions 32B that face towards the vehicle front side are able to make contact much more easily with the air passing through the radiator core 18. Accordingly, ozone in this air can be decomposed more efficiently. The second reason is that a radiator 16 having excellent ozone purification properties can be provided at low cost. The fan portions 32B are rotating bodies that rotate around the fan join portion 32A. Accordingly, the fan portions 32B have an increased opportunity to come into contact with the air compared to stationary objects, and are therefore able to decompose ozone in the air more efficiently. Consequently, it is possible to ensure a uniform ozone decomposition performance while restricting the size of the ozone decomposition area S. This contributes to a reduction in the quantity of ozone decomposition catalyst that needs to be coated. As a result, a radiator 16 having excellent ozone purification properties can be provided at low cost. The third reason is that the manufacturing process is comparatively simpler. In other words, because each fan portion 32B is formed by a plate-shaped body, spray coating the surface thereof can be performed relatively easily. In addition, after the electromotive fan assembly 30 has been assembled, the surfaces on the side of the fan portions 32B that face towards the vehicle front side are exposed at the front surface of the electromotive fan assembly 30. For this reason, spray coating the fan portions 32B after they have been assembled in the electromotive fan assembly 30 becomes possible, thereby simplifying the manufacturing process.

Furthermore, as is shown in FIG. 3, the fan join portion 32A of the radiator fan 32 and the motor assembly 34 are joined together via a bolt-fastening process using the fan bolts 42. More specifically, the fan join portion 32A is bolt-fastened to a housing 44 inside which the motor 34B is housed. The housing 44 is provided with a hollow, circular-column shaped main body portion 44A that is disposed coaxially with the axis of rotation of the motor 34B, and with a mounting portion 44B that is provided at an end portion on the vehicle rear side of the housing 44 and is joined to a pedestal portion 36B of the shroud 36. The main body portion 44A is formed so as to be able to rotate integrally with the motor 34B. A surface on the vehicle front side of this main body portion 44A forms a front surface portion 44A1 whose plate thickness direction extends in the vehicle front-rear direction, and a plurality of through holes 46 are provided so as to penetrate this front surface portion 44A1 in the plate thickness direction thereof. These through holes 46 have a smaller diameter than the through holes 38 formed in the fan join portion 32A, and are positioned so as to be coaxial with the relevant through holes 38. Moreover, a female thread 46A (see FIG. 4A) is formed on an internal circumferential surface of the through holes 46. The fan bolts 42 are inserted from the vehicle front side into these through holes 38 and 46. By screwing a male thread formed on the shaft portion 42A of each fan bolt 42 into the female thread 46A of the through holes 46 formed in the motor assembly 34, the motor assembly 34 can be joined to the radiator fan 32.

Note that a plurality of through holes 48 (not shown in the drawings) are formed so as to penetrate the mounting portion 44B of the housing 44 in the vehicle front-rear direction, and a female thread (no symbol for these is shown in the drawings) is formed on an internal circumferential surface of the through holes 48. These through holes 48 are positioned so as to be coaxial with similar through holes 36C that are provided in the pedestal portion 36B of the shroud 36. Shroud bolts 49 are inserted from the vehicle rear side into these through holes 36C and 48. By screwing a male thread (no symbol for these is shown in the drawings) formed on the shaft portion of each shroud bolt 49 into the female threads of the through holes 36C and 48, the motor assembly 34 can be joined to the shroud 36.

Figure 4A:
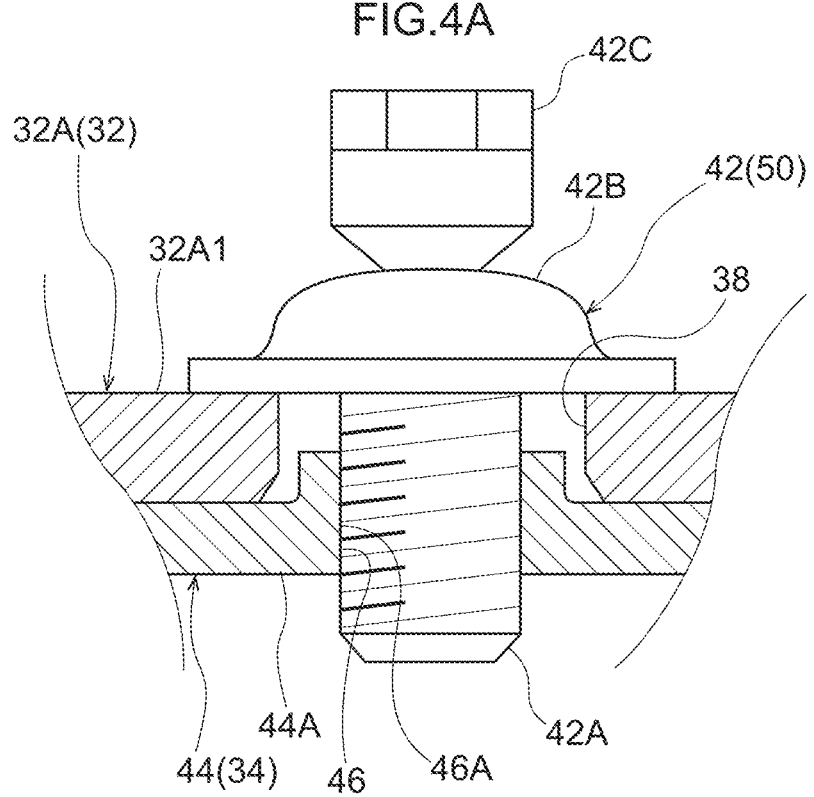
FIG. 4A is a cross-sectional view showing a state across a line 4-4 shown in FIG. 2 of a join portion between a radiator fan and a motor assembly forming part of this same electromotive fan assembly, and shows a state prior to fan bolts which are provided with a separation prevention device according to the present exemplary embodiment being fastened.
Figure 4B:
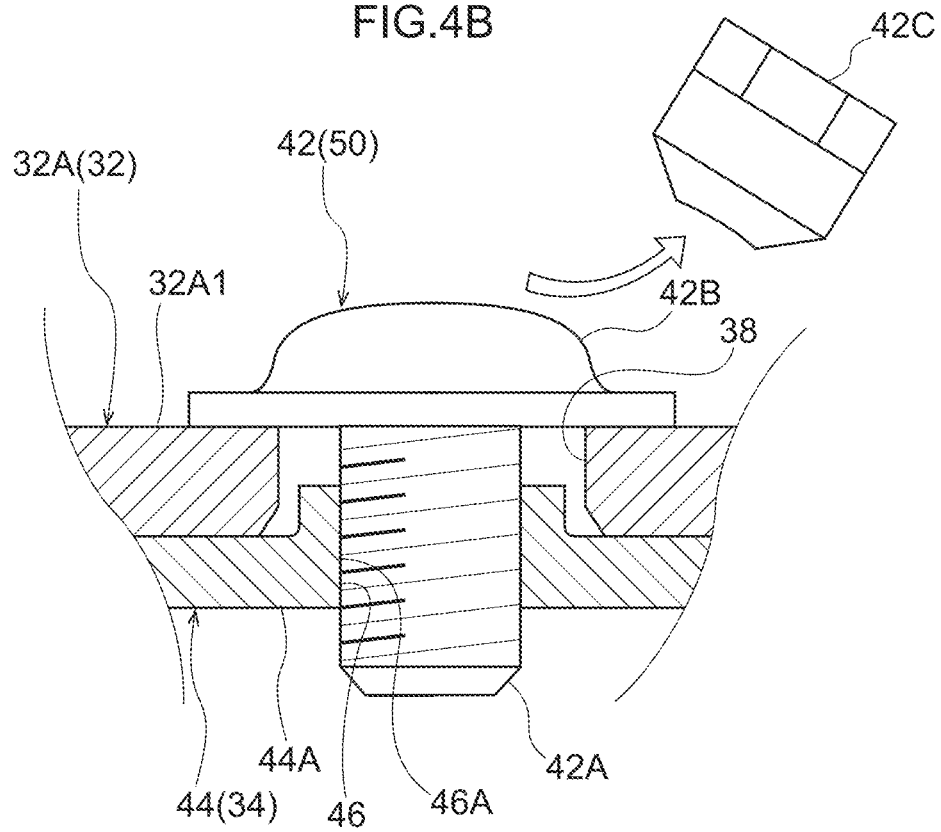
FIG. 4B is a cross-sectional view corresponding to FIG. 4A showing a state after the fan bolts which are provided with the separation prevention device according to the present exemplary embodiment have been fastened.

Here, as is shown in FIG. 4A and FIG. 4B, a separation prevention device 50 that prevents the radiator fan 32 being separated from the motor assembly is provided in the above-described join portion between the radiator fan 32 and the motor assembly 34.

(Separation Prevention Device)

As is shown in FIG. 4A and FIG. 4B, in the separation prevention device 50 of the present exemplary embodiment, the fan bolts 42 are formed by break head bolts. Note that FIG. 4A shows a state prior to the fan bolts 42 being fastened, while FIG. 4B shows a state after the fan bolts 42 have been fastened.

As is shown in these drawings, the fan bolts 42 prior to fastening are each provided with a shaft portion 42A on whose external circumferential surface is formed a male thread, a head portion 42B that is provided at one end of the shaft portion 42A, and a break-off portion 42C that is provided at a distal end of the head portion 42B. The break-off portion 42C serves as a torque input portion when the fan bolt 42 is being fastened, and is held in a fastening tool. The break-off portion 42C is formed so that, when torque that is equal to or greater than a threshold value is input into the break-off portion 42C, the break-off portion 42C twists and is separated from the head portion 42B. Accordingly, the fan bolt 42 is formed such that, because the break-off portion 42C is lost after the fan bolt 42 has been fastened, the fan bolt 42 cannot be subsequently undone. As a result, the radiator fan 32 can be prevented from being separated from the motor assembly.

(Variant Example of a Separation Prevention Device)

Figure 5A:
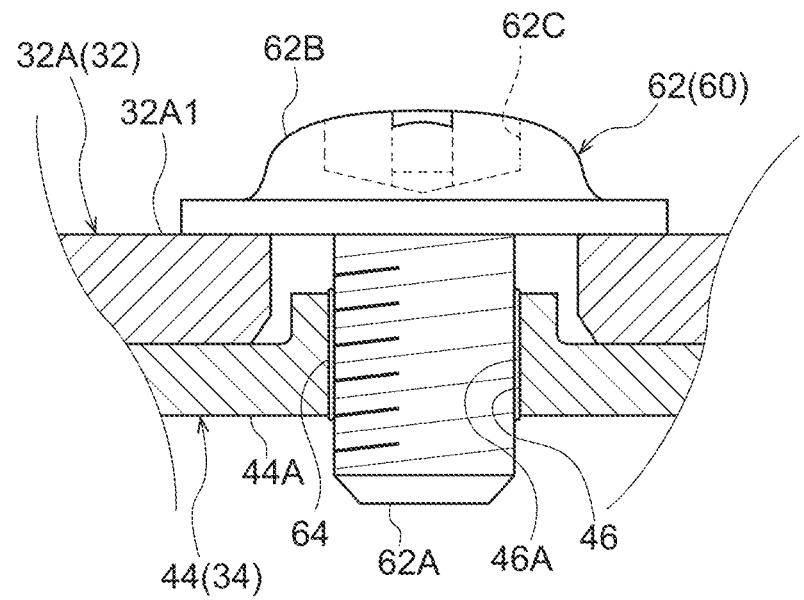
FIG. 5A is a cross-sectional view of a join portion corresponding to FIG. 4A and FIG. 4B in order to illustrate a variant example of a separation prevention device, and shows a state after the fan bolts have been fastened.
Figure 5B:
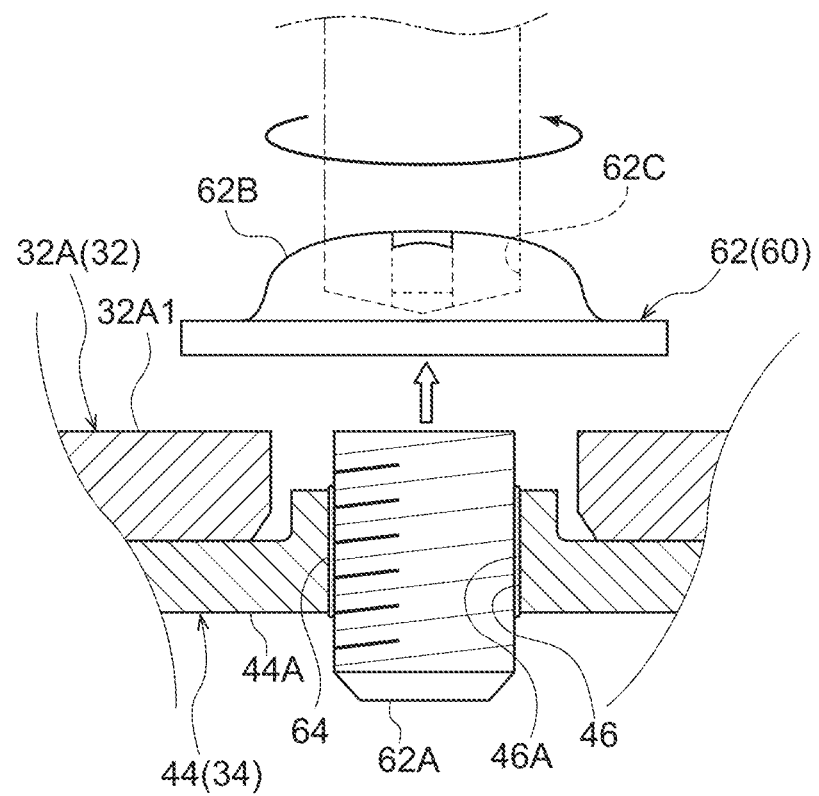
FIG. 5B is a cross-sectional view corresponding to FIG. 5A showing a state in which torque of a predetermined threshold value or more is input into the fan bolts provided with this same separation prevention device.

Additionally, it is also possible for a separation prevention device 60 shown in FIG. 5A and FIG. 5B to be used as the 'separation prevention device' according to the present disclosure. FIG. 5A shows a state after a fan bolt 62 has been fastened. FIG. 5B shows a state after the fan bolt 62 has been fastened when torque that is equal to or greater than a threshold value is input into a head portion 62B of the fan bolt 62.

As is shown in FIG. 5A, in the separation prevention device 60 according to this variant example, a structure is employed in which an adhesive agent 64 is coated onto the shaft portion 62A of the fan bolts 62. A male thread is formed on an external circumferential surface of each fan bolt 62, and each fan bolt 62 is provided with the shaft portion 62A on which the adhesive agent 64 is coated, a head portion 62B that is provided at one end of the shaft portion 62A, and a torque input portion 62C that is provided in an upper surface of the head portion 62B. The torque input portion 62C is formed by a recessed portion that is provided in the upper surface of the head portion 62B. A distal end of a fastening tool is inserted inside the torque input portion 62C and torque can be transmitted therefrom to the shaft portion 62A.

For example, a thermosetting adhesive agent is used for the adhesive agent 64. After the fan bolts 62 have been fastened, the join portion is heated, and thereby completing the curing of the adhesive agent. As a result, the shaft portion 62A of each fan bolt 62 and the housing 44 of the motor assembly 34 are adhered together.

According to the above-described structure, once the fan bolts 62 have been fastened, even if a user subsequently tries to remove the fan bolts 62, because the shaft portion 62A and the motor assembly 34 are adhered together, it is not possible for the fan bolts 62 to be undone. Moreover, in the present exemplary embodiment, a structure is employed in which, if torque that is equal to or greater than a threshold value is input into the torque input portion 62C, the head portion 62B twists and is broken off. After the head portion 62B has broken off, it becomes even more difficult to undo the fan bolt 62 (see FIG. 5B). As a result, it is possible to prevent the radiator fan 32 from being separated from the motor assembly.

(ECU)

Figure 6:
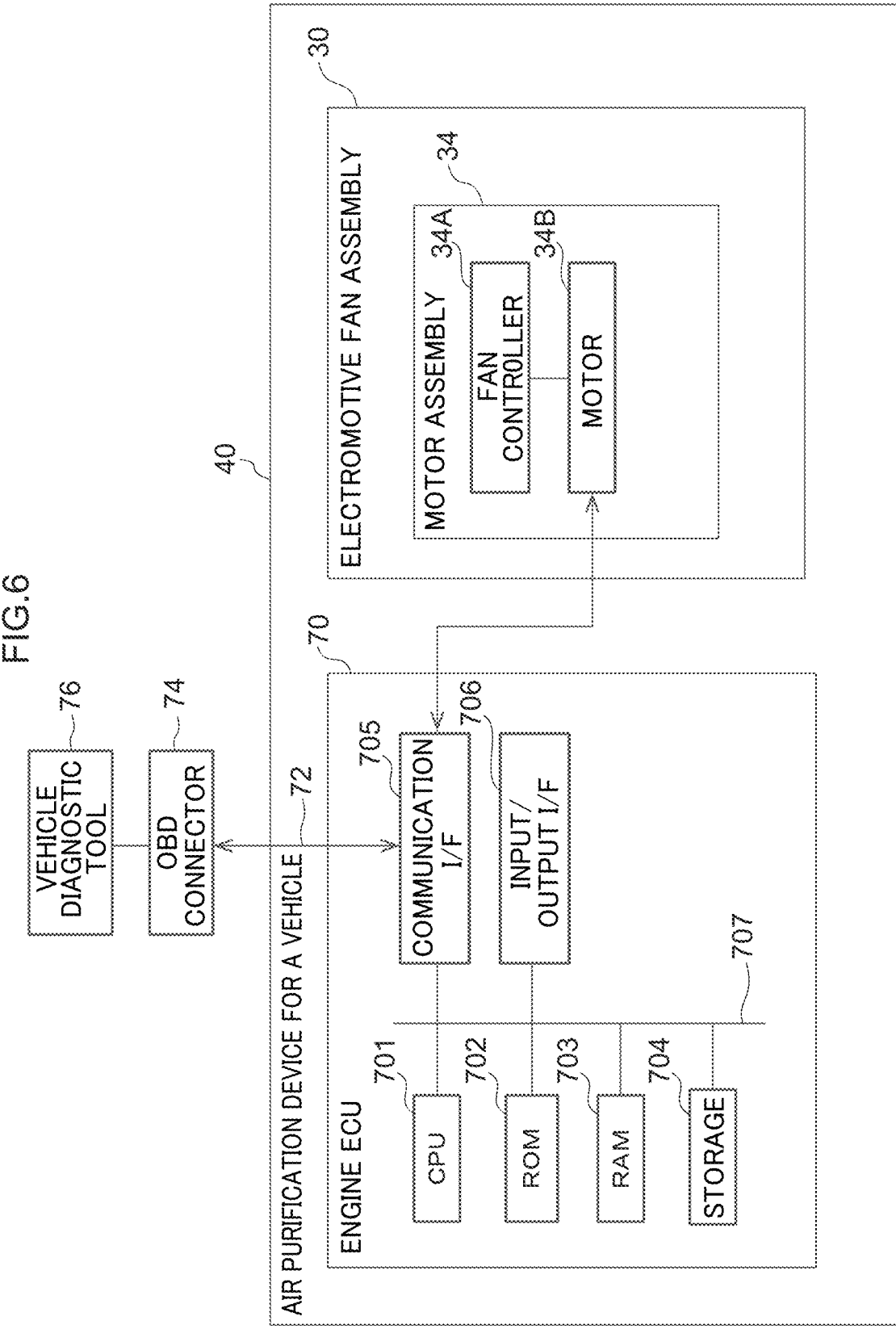
FIG. 6 is a block diagram showing a hardware structure of the air purification device for a vehicle according to the present exemplary embodiment.

Hereinafter, an engine ECU 70 which is serving as a predetermined ECU will be described using FIG. 6. As is shown in FIG. 6, the engine ECU 70 is formed so as to be able to be connected to an OBD connector 74 via an external bus (i.e., a communication bus) 72. Additionally, a vehicle diagnostic tool 76 is capable of being connected to the OBD connector 74. The communication performed in the external bus 72 is based on a CAN (Controller Area Network) protocol. Note that the communication format used in the external bus 72 is not limited to CAN, and CAN-FD (CAN with Flexible Data rate) and Ethernet (registered trademark) and the like may be used instead.

The engine ECU 70 is formed so as to include a CPU (Central Processing Unit) 701, ROM (Read Only Memory) 702, RAM (Random Access Memory) 703, storage 704, a communication I/F (InterFace) 705, and an input/output I/F 706. The CPU 701, ROM 702, RAM 703, storage 704, communication I/F 705, and input/output I/F 706 are mutually connected via an internal bus 707 so as to be able to communicate with each other.

The CPU 701 is a central processing unit and performs tasks such as executing various types of programs and controlling the respective units. In other words, the CPU 701 reads programs from the ROM 702, and executes these programs using the RAM 703 as a workspace.

The ROM 702 stores various types of programs and various types of data. The RAM 703 serves as a workspace and temporarily stores programs and data.

The storage 704 is formed by an HDD (Hard Disk Drive) or an SSD (Solid State Drive).

The communication I/F 705 is an interface that is used in order to connect with other ECUs mounted in the vehicle, as well as with the aforementioned OBD connector 74. A communication Standard based on a CAN protocol is used for this I/F. The communication I/F 705 is connected to the external bus 72.

The input/output I/F 706 is an interface that is used in order to perform communication between the respective devices mounted in the vehicle 10. In the present exemplary embodiment, the fan controller 34A of the electromotive fan assembly 30 is connected to the input/output I/F 706. In addition, a temperature sensor (not shown in the drawings) that detects the internal temperature inside the engine 14 is connected to the input/output I/F 706.

Figure 7:
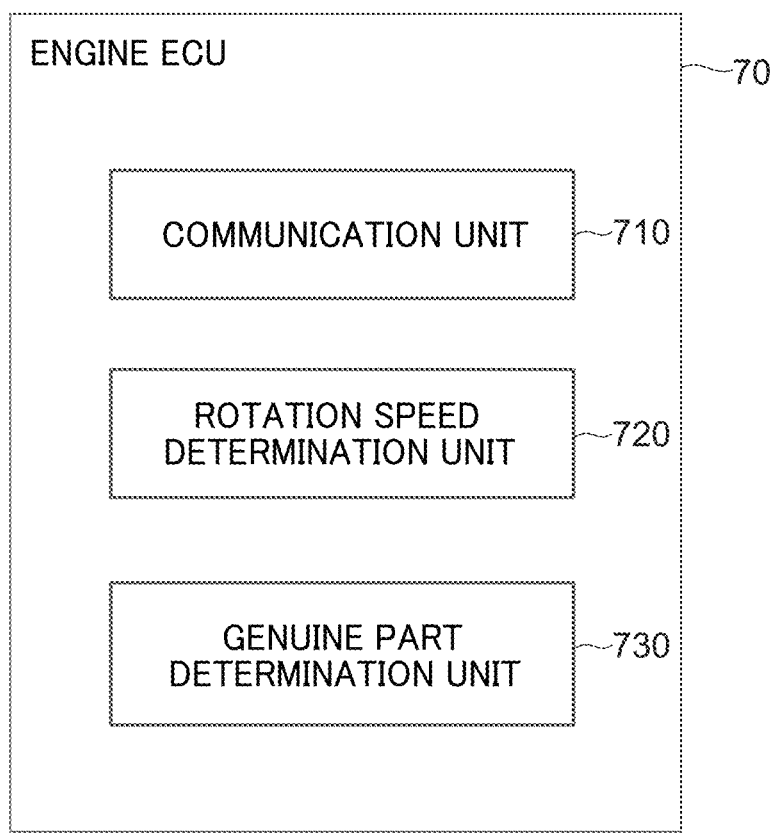
FIG. 7 is a block diagram showing a function structure of an engine ECU shown in FIG. 6.

FIG. 7 is a block diagram showing an example of a function structure of the engine ECU 70. As is shown in FIG. 7, the engine ECU 70 has a communication unit 710, a rotation speed determination unit 720, and a genuine part determination unit 730. Each function structure is achieved as a result of the CPU 701 reading and then executing an execution program stored in the ROM 702.

The communication unit 710 has a function of enabling signals to be transmitted and received via the input/output I/F 706 between the engine ECU 70 and the fan controller 34A. The communication unit 710 has an additional function of enabling signals to be transmitted and received via the communication I/F 705 between the engine ECU 70 and the vehicle diagnostic tool 76 which is connected to the OBD connector 74.

The rotation speed determination unit 720 has a function of determining the rotation speed of the motor 34B based on detection values from the temperature sensor that it receives via the input/output I/F 706.

The genuine part determination unit 730 has a function of performing determination processing (described below) using a predetermined execution program, and thereby determining whether or not the radiator fan 32 is a genuine part.

(Control Flow)

Next, the flow of determination processing will be described using the flowchart shown in FIG. 8.

In step S100 shown in FIG. 8, the CPU 701 executes a predetermined execution program in accordance with a predetermined signal received from the vehicle diagnostic tool 76, and transmits first data, which is contained in a collation signal, to the fan controller 34A.

In step S101, the CPU 701 determines whether or not a predetermined response, which has been determined in advance, to the first data has been received from the fan controller 34A. In other words, if this predetermined response is received, then the radiator fan 32 is determined to be a genuine part, while if the predetermined response is not received, then the radiator 32 is determined to be a non-genuine part. If it is determined in step S101 that the response has been received, then the routine moves to step S102. If, however, the CPU 701 determines that the response has not been received, then the routine moves to step S105, and it is determined that the radiator 32 is a non-genuine part. The processing routine is then ended.

Note that a case in which no signal is received from the fan controller 34A, and a case in which a different signal from the predetermined signal is received from the fan controller 34A may both serve as examples of the predetermined signal not being received.

In step S102 shown in FIG. 8, the CPU 701 transmits second data that is a different type of data from the first data, and that, in the same way as the first data, is contained in a collation signal to the fan controller 34A. This second data may be, for example, random data. More specifically, specific keys are stored in advance in the engine ECU 70 and in the fan controller 34A. When specific random data is received from the engine ECU 70, the fan controller 34A rewrites the received data using the relevant key, and sends it back to the engine ECU 70.

In step S103, the CPU 701 determines whether or not a predetermined response to the second data has been received from the fan controller 34A. If it is determined in step S103 that the response has been received, the routine moves to step S104, and the radiator fan 32 is determined to be a genuine part. The processing routine is then ended. If, however, the CPU 701 determines that the response has not been received, then the routine moves to step S105, and it is determined that the radiator 32 is a non-genuine part. The processing routine is then ended.

In this way, in the determination processing shown in FIG. 8, the CPU 701 sequentially transmits two types of collation signals (i.e., the first data and the second data) to the fan controller 34A, and determines whether or not the radiator fan 32 is a genuine part based on the responses from the fan controller 34A to the respective collation signals. When the determination results for each collation signal have all determined that the radiator fan 32 is a genuine part, then the radiator fan 32 can be determined to be a genuine part.

(Flow of Processing According to Variant Example)

Next, a flow of a variant example of the determination processing will be described using the flowchart in FIG. 9.

In step S200 shown in FIG. 9, the CPU 701 executes a predetermined execution program in accordance with a predetermined signal received from the vehicle diagnostic tool 76, and transmits first data, which is contained in a collation signal, to the fan controller 34A.

In step S201, the CPU 701 stores a determination result for a determination as to whether or not a predetermined response, which has been determined in advance, to the first data has been received from the fan controller 34A.

In step S202, the CPU 701 determines whether or not the first data has been transmitted n number of times (wherein n≥2) to the fan controller 334A. If it is determined in step S202 that the first data has been transmitted n number of times, the routine moves to step S203. If, on the other hand, the CPU 701 determines that the first data has not been sent n number of times, the routine returns to step S200 and the processing is repeated.

In step S203 shown in FIG. 9, it is determined whether or not a predetermined response from the fan controller 34A has been received m number of times (wherein 2≤m≤n) in the n number of stored determination results. In other words, it is determined whether or not the radiator fan 32 has been determined to be a genuine part m number of times or more. If it is determined in step S203 that the predetermined response has been received m number of times or more, then the routine moves to step S204. If, however, The CPU 701 determines that the predetermined response has not been received m number of times or more, then the routine moves to step S207 and the radiator fan 32 is determined to be a non-genuine part. The processing routine is then ended.

Because the processing of step S204 and thereafter shown in FIG. 9 is the same as the processing of step S102 and thereafter shown in FIG. 8, no description there is given here.

In this way, in the variant example of the determination processing shown in FIG. 9, the CPU 701 transmits a collation signal (i.e., the first data) n number of times to the fan controller 34A, and determines n number of times whether or not the radiator fan 32 is a genuine part based on the responses from the fan controller 34A. In addition, if among the n number of times, it is determined m (wherein m≤n) number of times or more that the radiator fan 32 is a genuine part, then the radiator fan 32 can be determined to be a genuine part.

(Actions and Effects)

Next, actions and effects of the present exemplary embodiment will be described.

In the air purifier for a vehicle 40 according to the present exemplary embodiment, when air is introduced into the engine bay 12 interior while the vehicle 10 is traveling or while the radiator fan 32 is rotating, the air that passes through the radiator core 18 comes into contact with the fan portion 32B of the radiator fan 32. As a result, ozone in this air reacts with the ozone decomposition catalyst coated onto the surface of the fan portion 32B, and is decomposed into a different substance so that the air can be purified.

Here, the ozone decomposition catalyst is coated onto the fan portion 32B that forms part of the radiator fan. In addition, the fan portion 32B is formed in a planar shape. Because of this, the ozone decomposition catalyst can be easily coated onto the fan portion 32B using general spray coating, and can therefore be supplied at low cost.

Moreover, in the present exemplary embodiment, the radiator fan 32 is joined via the motor assembly 34 to the shroud 36 that is fixed to the vehicle 10. In addition, a separation prevention device 50 that prevents the radiator fan 32 from being separated from the motor assembly 34 is provided in a join portion between the radiator fan 32 and the motor assembly 34. Because of this, it is possible to prevent a situation such as the radiator fan 32 of the air purification device for a vehicle 40 being replaced by a non-genuine radiator fan when maintenance or the like is performed during the period of use of the vehicle 10.

As is shown in FIG. 4A and FIG. 4B, as an example, the join portion between the radiator fan 32 and the motor assembly 34 is bolt-fastened by the fan bolts 42 which are formed by break head bolts. Because of this, once the fan bolts 42 have been fastened, it is not possible to subsequently undo the fastening provided by the fan bolts 42 so that, consequently, the radiator fan 32 cannot be removed. As a result, it is possible to prevent the radiator fan 32 from being separated from the motor assembly 34. Moreover, according to the above-described structure, the separation prevention device 50 can be installed at the same time as the radiator fan 32 is assembled, and can therefore be provided without the manufacturing process having to be altered. Additionally, there is no need to increase the number of components used for the join portion of the radiator fan 32. As a result, it is possible to prevent a situation in which the radiator fan 32 is replaced by a non-genuine radiator fan, and the air purification device for a vehicle 40 can be provided at a low cost.

As is shown in FIG. 6, in the separation prevention device 60 according to the variant example, the join portion between the radiator fan 32 and the motor assembly 34 is bolt-fastened by the fan bolts 62 which have the adhesive agent 64 coated on the shaft portion 62A thereof. Because of this, when the fan bolts 62 are fastened, the shaft portion 62A and the motor assembly 34 are adhered together so that the fan bolts 62 are unable to be removed. As a consequence, it is possible to prevent the radiator fan 32 from being separated from the motor assembly 34. Moreover, according to the above-described structure, this separation prevention device 60 can be installed at the same time as the radiator fan 32 is assembled, and can therefore be provided without the manufacturing process having to be altered. Additionally, there is no need to increase the number of components used for the join portion of the radiator fan 32. As a result, it is possible to prevent a situation in which the radiator fan 32 is replaced by a non-genuine radiator fan, and the air purification device for a vehicle 40 can be provided at a low cost.

Moreover, in the present exemplary embodiment, the join portion between the motor assembly 34 and the shroud 36 is bolt-fastened by the shroud bolts 49. In addition, the shroud bolts 49 are fastened from the vehicle rear side of the shroud 36 so as to join the shroud 36 and the motor assembly 34 together. Because of this, in order to be able to remove the shroud bolts 49, it is necessary to first perform the task of removing the shroud 36 from the vehicle body. For this reason, the task of removing the motor assembly 34 from the shroud 36 is a large-scale operation requiring considerable time and labor. As a consequence, it is possible to inhibit a genuine radiator fan 32 being replaced by a non-genuine radiator fan that is formed integrally with the motor assembly.

In the air purification device for a vehicle 40, the rotation speed of the radiator fan 32 is controlled by the fan controller 34A, and the fan controller 34A performs this control based on control signals from the engine ECU 70.

Here, in the present exemplary embodiment, using the communication environment between the engine ECU 70 and the fan controller 34A which is already established, a predetermined collation signal is transmitted from the engine ECU 70 to the fan controller 34A. A determination is then made as to whether or not the radiator fan 32 is a genuine part based on the response from the fan controller 34A to this collation signal. In this way, it is possible to determine whether a part is a genuine part simply by adding the predetermined collation signal via software instead of by adding a new hardware structure to the vehicle 10. As a result, it is possible to determine whether or not the radiator fan 32 is a genuine part at a low cost.

More specifically, as is shown in FIG. 8, the CPU 701 forming part of the engine ECU 70 sequentially transmits a plurality of types of collation signals to the fan controller 34A, and determines whether or not the radiator fan 32 is a genuine part based on the plurality of types of collation signals. In the determination processing shown in FIG. 8, based on two types of collation signals, namely, the first data and the second data, whether or not the radiator fan 32 is a genuine part is determined. As a result, it is possible to prevent an unscrupulous operator from evading a determination result, and to thereby improve the accuracy when determining whether or not the radiator fan 32 is a genuine part.

In a determination that is made by transmitting and receiving collation signals between the engine ECU 70 and the fan controller 34A, there is a possibility that an incorrect determination will be made because of electromagnetic noise coming from other electronic instruments mounted in the vehicle 10. From the standpoint of eliminating this type of incorrect determination and improving accuracy when determining whether or not the radiator fan is a genuine part, in the present exemplary embodiment, the variant example shown in FIG. 9 can also be used.

In the variant example shown in FIG. 9, the CPU 701 forming part of the engine ECU 70 makes determinations a plurality of times (n number of times) based on collation signals (i.e., the first data), and when it is determined a predetermined threshold value number of times (m number of times) or more that the radiator fan 32 is a genuine part, then the radiator fan 32 is determined to be a genuine part. As a result, it is possible to reduce the effects of incorrect determinations that are due to electromagnetic noise, and it is thereby possible to improve the accuracy when determining whether or not a radiator fan 32 is a genuine part.

(Supplementary Description)

In the above-described exemplary embodiment, a structure is employed in which the ozone decomposition catalyst is coated onto the vehicle front-side surface of the fan portion 32B of the radiator fan 32, however, the present disclosure is not limited to this. It is also possible to employ a structure in which the ozone decomposition catalyst is only coated onto the rear surface of the plate-shaped fan portion 32B, or onto both front and rear surfaces thereof. Alternatively, it is also possible to employ a structure in which the entire radiator fan 32 is coated with the ozone decomposition catalyst.

In the separation prevention device 60 that is shown as a variant example in FIG. 5A and FIG. 5B, a structure is employed in which the fan bolts 62 and the motor assembly 34 are adhered together using the adhesive agent 64, however, the present disclosure is not limited to this, and it is also possible to employ a structure in which the fan bolts 62 and the radiator fan 32 are adhered together. Alternatively, it is also possible to employ a structure in which the fan bolts 62 are adhered to both the motor assembly 34 and the radiator fan 32.

In the above-described embodiment, a structure is employed in which the separation prevention devices 50 and 60 are only provided in the join portion between the radiator fan 32 and the motor assembly 34, however, it is also possible to employ a structure in which the separation prevention devices 50 and 60 are provided in the join portion between the motor assembly 34 and the shroud 36.

Moreover, the separation prevention device is not limited to either of the separation prevention devices 50 and 60 of the above-described embodiment. For example, a separation prevention device that joins together the join portion between the radiator fan and the motor assembly via a crimping structure may also be used. Alternatively, a separation prevention structure that joins together the join portion between the radiator fan and the motor assembly via welding may also be used. In these modes as well, after the radiator fan and the motor assembly have been assembled together, it is possible to inhibit the radiator fan and the motor assembly from being subsequently separated by a user.

Note that, in the above-described embodiment, a structure is employed in which the determination processing is performed by the engine ECU 70, however, the present disclosure is not limited to this and it is also possible to instead employ a structure in which the determination processing is performed using another ECU mounted in a vehicle. Moreover, in the above-described embodiment, a structure is employed in which the determination processing is started in accordance with a predetermined signal received from the vehicle diagnostic tool 76, however, the present disclosure is not limited to this, and it is also possible to instead employ a structure in which the determination processing is started in accordance with a signal created by another instrument, for example, by an operating unit that is mounted in the vehicle.

Note that in the above-described exemplary embodiment, it is also possible for the various types of processing executed by the CPU 702 after reading software (i.e., a program) to instead be executed by various types of processors other than a CPU. Examples of other types of processors in this case include PLD (Programmable Logic Devices) whose circuit structure can be altered after manufacturing such as an FPGA (Field-Programmable Gate Array), and dedicated electrical circuits and the like which are processors having a circuit structure that is designed specifically in order to execute a particular processing such as ASIC (Application Specific Integrated Circuits). In addition, the various processings may be executed by just one type from among these various types of processors, or by a combination of two or more processors that are either the same type or are mutually different types (for example by a plurality of FPGA or by a combination of a CPU and an FPGA). Furthermore, the hardware structures of these different types of processors are, more specifically, electrical circuits obtained by combining circuit elements such as semiconductor elements and the like.

Moreover, in the above-described exemplary embodiment, a mode is described in which each program is stored (i.e., is installed) in advance on a non-transitory recording medium capable of being read by a computer. For example, in the vehicle control unit 20 the control program 200 is stored in advance in the ROM 20B. Moreover, for example, the execution program in the engine ECU 70 of the vehicle 10 is stored in advance in the ROM 702. In addition, the processing program 300 in the processing server 14 is stored in advance in the storage 144. However, the present disclosure is not limited to this, and it is also possible for each program to be provided by being recorded on a non-transitory recording medium such as a CD-ROM (Compact Disc Read Only Memory), a DVD-ROM (Digital Versatile Disc Read Only Memory), and a USB (Universal Serial Bus) memory. Moreover, it is also possible to enable each program to be downloaded from an external device via a network.

The processing flows described in the forgoing exemplary embodiment are also merely examples thereof, and insofar as this does not cause a departure from the spirit or scope of the present disclosure, steps that are not required may be deleted, or new steps added, or the sequence of the steps may be altered.

An exemplary embodiment of the present disclosure has been described above, however, the present disclosure is not limited to this. Various modifications and the like may be made to the present disclosure insofar as they do not depart from the spirit or scope of the present disclosure.

What is claimed is:

1. An air purification device for a vehicle, comprising:
    a radiator core that is provided in an interior portion of an engine bay in a front portion of a vehicle, and through which air that has been introduced from a vehicle front side passes into the interior portion of the engine bay toward a vehicle rear side;
    a radiator fan that is disposed at the vehicle rear side of the radiator core, and that has plate-shaped fan portions that are rotated by rotation drive force supplied from a motor assembly so as to introduce air from outside of the engine bay into the interior portion of the engine bay, the fan portions being coated with an ozone decomposition catalyst; and
    a shroud that is fixed to the vehicle, wherein the radiator fan is joined via the motor assembly to the shroud, wherein
    the motor assembly has a fan controller for controlling a rotation speed of the radiator fan based on a control signal from a predetermined ECU, and the predetermined ECU comprises:
        a memory; and
        a processor that is connected to the memory, and
    the predetermined ECU is formed so as to determine a rotation speed of the radiator fan, transmit a collation signal to the fan controller, and then determine whether or not the radiator fan is a genuine part based on a response from the fan controller regarding the transmitted collation signal.

2. The air purification device according to claim 1, wherein:
    a separation prevention device that prevents the radiator fan from being separated from the motor assembly is provided at a join portion between the radiator fan and the motor assembly.

3. The air purification device according to claim 2, wherein:
    the join portion between the radiator fan and the motor assembly is bolt-fastened by fan bolts, and
    in the separation prevention device, the fan bolts comprise break head bolts, such that after the fan bolts have been fastened, the radiator fan is prevented from being separated from the motor assembly.

4. The air purification device for a vehicle according to claim 2, wherein:
    the join portion between the radiator fan and the motor assembly is bolt-fastened by fan bolts, and
    the separation prevention device is configured such that, after being fastened, the fan bolts can be adhered, by means of an adhesive agent that is coated on a shaft portion thereof, to at least one of the radiator fan or the motor assembly, such that the radiator fan is prevented from being separated from the motor assembly.

5. The air purification device for a vehicle according to claim 2, wherein:
    a join portion between the motor assembly and the shroud is bolt-fastened by shroud bolts, and
    the shroud bolts are fastened from the vehicle rear side of the shroud so as to join the shroud and the motor assembly together.

6. The air purification device for a vehicle according to claim 2, wherein the radiator core is fixed to a front side of the shroud such that the radiator core and the shroud form a single body.

7. An air purification device for a vehicle, comprising:
    a radiator core that is provided in an interior portion of an engine bay in a front portion of a vehicle, and through which air that has been introduced from a vehicle front side passes into the interior portion of the engine bay toward a vehicle rear side;
    a radiator fan that is disposed at the vehicle rear side of the radiator core, and that has plate-shaped fan portions that are rotated by rotation drive force supplied from a motor assembly so as to introduce air from outside of the engine bay into the interior portion of the engine bay, the fan portions being coated with an ozone decomposition catalyst, wherein
    the motor assembly has a fan controller that controls a rotation speed of the radiator fan based on a control signal from a predetermined ECU,
    the predetermined ECU comprises:
        a memory; and
        a processor that is connected to the memory, and
        the predetermined ECU is formed so as to determine the rotation speed of the radiator fan, transmit a collation signal to the fan controller, and then determine whether or not the radiator fan is a genuine part based on a response from the fan controller regarding the transmitted collation signal.

8. The air purification device for a vehicle according to claim 7, wherein the processor sequentially transmits a plurality of types of collation signals to the fan controller, determines whether or not the radiator fan is a genuine part based on responses from the fan controller to each of the collation signals, and determines that the radiator fan is a genuine part when determination results for each of the collation signals all determine that the radiator fan is a genuine part.

9. The air purification device for a vehicle according to claim 7, wherein: the processor transmits the collation signals n times to the fan controller, and determines, n times, whether or not the radiator fan is a genuine part based on the responses from the fan controller, wherein n≥2, and determines that the radiator fan is a genuine part when the radiator fan is determined to be a genuine part at least m times, wherein m≤n.

* * * * *